C. O. ROE.
COMBINED PAN LIFTER AND DRAINER.
APPLICATION FILED MAY 12, 1916.
1,219,779.
Patented Mar. 20, 1917.
2 SHEETS—SHEET 2.
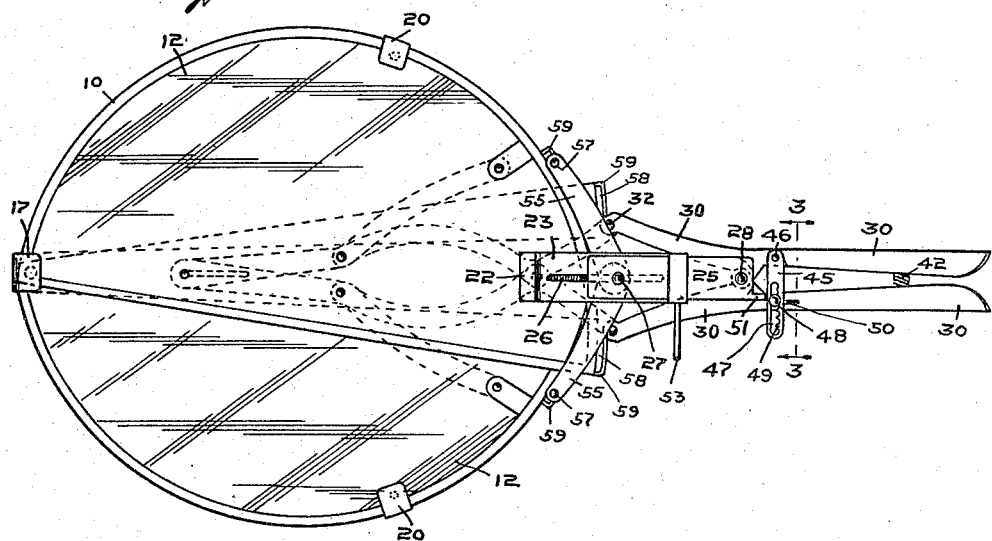
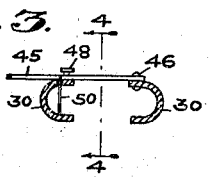
INVENTOR
Charles O. Roe,
By Minturn & Woerner,
ATTORNEYS.

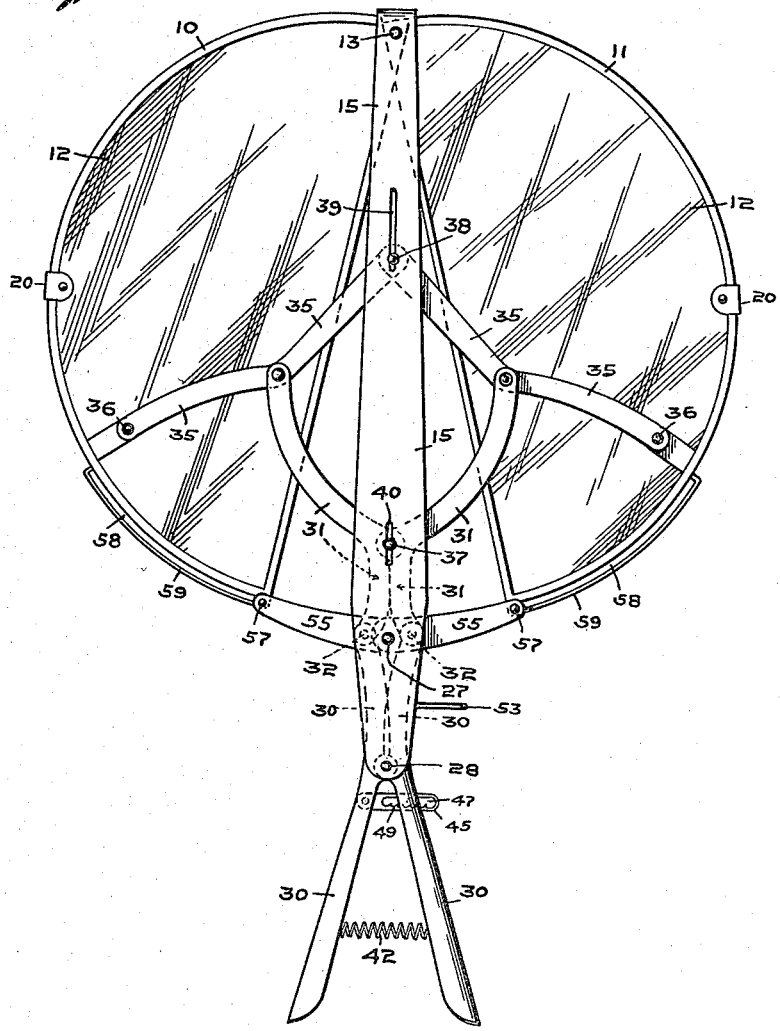

UNITED STATES PATENT OFFICE.

CHARLES O. ROE, OF INDIANAPOLIS, INDIANA, ASSIGNOR, BY DIRECT AND MESNE ASSIGNMENTS, TO ROE AND HARMON NOVELTY COMPANY, OF INDIANAPOLIS, INDIANA, A CORPORATION OF INDIANA.

COMBINED PAN LIFTER AND DRAINER.

1,219,779.  Specification of Letters Patent.  Patented Mar. 20, 1917.

Application filed May 12, 1916. Serial No. 97,155.

*To all whom it may concern:*

Be it known that I, CHARLES O. ROE, a citizen of the United States, residing at Indianapolis, in the county of Marion and State of Indiana, have invented certain new and useful Improvements in Combined Pan Lifters and Drainers, of which the following is a specification.

This invention relates to a combined culinary pan lifter and drainer; and the object of the invention consists in the provision of a device of the above character whereby culinary pans and similar vessels can be readily taken hold of and removed from the stove while such vessels are hot.

A further object of the invention consists in the provision of a device of the above character by which culinary vessels, in which potatoes and other vegetables are boiled, can be drained of water without discharging the vegetable contents of such vessels.

A still further object of the invention consists in the provision of a device of the above character which will be simple in construction, and efficient in operation.

I accomplish the objects of the invention by means of the construction illustrated in the accompanying drawings, forming a part hereof, in which—

Figure 1 is a top or plan view of my improved combined culinary pan lifter and drainer, showing the parts in their extended positions. Fig. 2 is an underside plan view of the device, showing the parts in their contracted positions. Fig. 3 is a fragmentary detail view in cross section, on the line 3—3 in Fig. 2, showing the locking device. Fig. 4 is a fragmentary detail longitudinal sectional view on the line 4—4 in Fig. 3.

Referring to the drawings, 10 and 11 represent a pair of semi-circular frames having a filling of perforated cloth 12, through which water is allowed to discharge when draining a vessel. The frames 10 and 11 are pivotally connected together by means of a pivot 13, the latter being securely anchored in the supporting-frame 15. The outer end of the supporting-frame 15 is bent downward and under the frames 10 and 11 to provide a hook 17 (see Fig. 2) adapted to engage the underside of the customary flange surrounding the upper edge of the usual culinary vessel. Frames 10 and 11 are provided near the center of their outer marginal edges with hooks 20 which are adapted to hook under the flange surrounding the upper edge of the culinary vessel and about ninety degrees from the hook 17, the hooks 20 sustaining the vessel at its transverse center. The side of the vessel adjacent the operator is supported by means of a hook 22 which is formed integrally with the movable plate 23. Plate 23 is susceptible of being moved longitudinally to enable hook 22 to be moved into contact with the adjacent edge of the culinary vessel, and rides against a stationary plate 25. The longitudinal movement of plate 23 is maintained along a determined path by means of a slot 26 through which a rivet 27 passes. Plate 25 is held stationary by means of rivets 27 and 28 which are fixed in the supporting-frame 15. To accommodate the device to vessels of different diameters and to allow the hooks 20 to engage the vessels, contemplates a shifting of the frames 10 and 11 toward each other up to a point where the frames lap over each other for a considerable distance as shown in Fig. 2 of the drawings. This range of movement of said frames will insure sufficient movement to carry hooks 20 toward each other to engage the smallest vessel likely to be employed. The shifting of frames 10 and 11 and for the handling of the device is accomplished by means of a pair of handle-levers 30 which operate between plate 25 and supporting-frame 15 and are fulcrumed at rivet 28. The ends of the handle-levers 30 adjacent to the frames 10 and 11 pivotally engage a pair of links 31 at 32, and the opposite ends of said links pivotally engage with the central portions of the levers 35. One end of each lever 35 pivotally engages the frames 10 and 11 at 36 and the opposite ends of the levers 35 are pivotally connected together by means of a rivet 38 which passes through a slot 39 in the supporting-frame 15. The slot 39 is of sufficient length to afford free movement of rivet 38 as the latter is shifted when the levers 35 and frames 10 and 11 are moved toward each other when the device is contracted. Links 31 are pivoted together mid-way of their length by means of a rivet 37 which extends through a slot 40 in the supporting-frame 15, the said slot being of sufficient length to allow the rivet to change its position with the movement of the links 31 when the device is contracted. After the device is placed over a vessel and contracted to enable hooks 17, 20 and 22 to engage the flange surrounding the upper edge of the vessel, the said device may be prevented from expanding under the influence of spring 42 by means of a locking device comprising a bar 45 which is pivoted at 46 to the underside of one of the handle-levers. The locking-bar 45 is provided with a longitudinal slot 47 within which rides a pin 48 mounted in the adjacent handle-lever 30. The pin 48 is provided with a head to prevent accidental displacement of the locking-bar 45, the longitudinal slot 47 is provided in one of its edges with a series of notches 49 adapted to catch the pin 48 and thus hold both handle-levers 30 when the device is contracted to the point desired. The notched edge of slot 47 is normally held against pin 48 by means of a spring 50, so that when the outer ends of the handle-levers 30 are moved toward each other the locking-bar 45 is in position to hold said levers until it is desired to free the vessel, by expanding the device. The locking-bar 45 is automatically disconnected from pin 48 by means of an extension 51 carried by movable plate 23, the latter being moved longitudinally when the operator places the finger upon the knob 53 in retracting hook 22 from the flange on the vessel, and when the operator releases his grip from the handle-levers 30 said handles are moved apart under influence of spring 42, and through the connections of said handle-levers 30 with links 31, and links 31 with levers 35 the frames 10 and 11 are moved apart to disconnect hooks 17 and 20 from the vessel.

Frames 10 and 11 are of necessity made of frail material and are liable to bend and warp, and to keep the adjacent edges of said frames in alinement so as to insure uninterrupted passing of said edges, I provide means for guiding the free ends of said frames—the ends opposite the pivot 13. The guide means contemplates the use of a pair of arms 55 which are pivotally mounted between supporting-frame 15 and plate 25 by means of the rivet 27. These arms have a slight movement about the rivet 27 to adjust themselves to the varying degrees of angular movement of the frames 10 and 11 as the latter swing upon pivot 13, but the arms 55 are substantially rigid as to lateral movement, and in their free ends are provided with pins 57 which pass through suitable slots 58 formed by means of wires 59 extending some distance along the peripheral edges of the frames 10 and 11. The arms 55 extend laterally of the rivet 27 and supporting-frame a sufficient distance to so remove the pins 57 from the center of frame 15 to permit frames 10 and 11 to be extended the desired distance, as clearly shown in Fig. 1, while the support and guide afforded the frames 10 and 11 through the introduction of the arms 55, pins 57 and wires 59 will insure proper guiding of the adjacent edges of frames 10 and 11 at all times.

Having thus fully described my said invention, what I desire to secure by Letters Patent, is—

1. A device of the above described class comprising a pair of pivotally connected frames having perforated fillings, a supporting-frame for mounting said pivoted frames, a pair of levers pivotally connected at one end with said frames and the opposite ends of the levers having a common pivotal sliding connection in the supporting frame, a pair of actuating handles, and a pair of links pivotally engaging both the handles and levers and having a common sliding fulcrum in said supporting frame.

2. A device of the above described class comprising a pair of pivotally connected frames having perforated fillings, a supporting frame for mounting said pivoted frames, hooks carried by said pivoted frames to engage and support the vessel, and a movable hook arranged on the supporting-frame and independent of the pivoted frames, said hook adapted to be moved to engage and support the vessel.

3. A device of the above described class comprising a pair of movable frames pivoted at their outer ends and having perforated fillings, a pair of actuating handles, means interposed between said handles and pivoted frames to move the pivoted frames toward and away from each other when said handles are oscillated, and means for guiding the inner ends of the pivoted frames in determined paths.

In witness whereof, I have hereunto set my hand and seal at Indianapolis, Indiana, this 2nd day of May, A. D. one thousand nine hundred and sixteen.

CHARLES O. ROE. [L. S.]

Copies of this patent may be obtained for five cents each, by addressing the "Commissioner of Patents, Washington, D. C."